(12) United States Patent
Graf

(10) Patent No.: US 9,453,567 B2
(45) Date of Patent: Sep. 27, 2016

(54) DEVICE FOR TRANSMITTING FORCE

(75) Inventor: Hartmut Graf, Urbach (DE)

(73) Assignee: VOITH PATENT GMBH, Heidenheim (DE)

( * ) Notice: Subject to any disclaimer, the term of this patent is extended or adjusted under 35 U.S.C. 154(b) by 0 days.

(21) Appl. No.: 14/110,962

(22) PCT Filed: Apr. 18, 2012

(86) PCT No.: PCT/EP2012/001669
§ 371 (c)(1),
(2), (4) Date: Dec. 23, 2013

(87) PCT Pub. No.: WO2012/143123
PCT Pub. Date: Oct. 26, 2012

(65) Prior Publication Data
US 2014/0141916 A1 May 22, 2014

(30) Foreign Application Priority Data
Apr. 19, 2011 (DE) .......................... 10 2011 018 236

(51) Int. Cl.
*F16H 47/00* (2006.01)
*F16H 47/08* (2006.01)
(Continued)

(52) U.S. Cl.
CPC ............. *F16H 47/08* (2013.01); *F16H 47/06* (2013.01); *F16H 47/085* (2013.01); *F16H 2037/088* (2013.01)

(58) Field of Classification Search
CPC ...... F16H 47/06; F16H 47/08; F16H 47/085; F16H 2037/088
USPC ............... 475/31, 35, 47, 59, 207, 218, 302; 60/331–332, 361–362
See application file for complete search history.

(56) References Cited

U.S. PATENT DOCUMENTS 2,147,528 A * 2/1939 Fottinger ......................... 475/53
2,162,803 A * 6/1939 England .......................... 475/35
(Continued)

FOREIGN PATENT DOCUMENTS

| CH | 218243 | 3/1942 |
| DE | 34 41 877 | 5/1986 |

(Continued)

OTHER PUBLICATIONS

International Search Report dated Jun. 13, 2012 in International Application No. PCT/EP2012/001669.
(Continued)

*Primary Examiner* — Jacob S Scott
*Assistant Examiner* — Tinh Dang
(74) *Attorney, Agent, or Firm* — Faegre Baker Daniels LLP

(57) ABSTRACT

The invention relates to a device (1) for transmitting force from an input shaft (4) connected to a drive assembly (2) having constant speed to an output shaft (6) connected to a working machine (3) having variable speed, comprising: a hydrodynamic transducer (20); and a differential transmission designed as a planetary gear unit (1), comprising a ring gear (12), a sun gear (13) and a planet carrier (14) having a plurality of planets (15) as elements of the planetary gear unit. The invention is characterized in that: the hydrodynamic transducer is designed as a counter-movement transducer; the input shaft is directly connected to a pump impeller (7) of the hydrodynamic transducer and a first element (14) of the planetary gear unit; a turbine wheel (10) of the hydrodynamic transducer is directly connected to a second element (13) of the planetary gear unit, and the output shaft is connected at least indirectly to a third element of the planetary gear unit.

20 Claims, 1 Drawing Sheet

(51) Int. Cl.
*F16H 47/06* (2006.01)
*F16H 37/08* (2006.01)

(56) References Cited

U.S. PATENT DOCUMENTS

| | | | | |
|---|---|---|---|---|
| 2,203,177 | A | * | 6/1940 | Patterson .................... 475/37 |
| 2,231,784 | A | * | 2/1941 | Von Thungen ................ 475/31 |
| 2,368,801 | A | * | 2/1945 | Carnagua et al. ......... 74/473.21 |
| 2,615,351 | A | * | 10/1952 | Kelbel .................... F16H 47/08 192/53.35 |
| 2,737,827 | A | * | 3/1956 | Seybold ................. F16H 47/08 475/39 |
| 3,986,413 | A | | 10/1976 | Stockton |
| 4,440,042 | A | * | 4/1984 | Holdeman ................... 475/269 |
| 4,726,255 | A | * | 2/1988 | Humpfer et al. .............. 475/34 |
| 7,559,813 | B2 | * | 7/2009 | Basteck ........................ 440/6 |
| 7,942,777 | B2 | * | 5/2011 | Meitin ........................ 475/59 |
| 8,500,586 | B2 | * | 8/2013 | Harif .......................... 475/72 |
| 2007/0049453 | A1 | | 3/2007 | Nagai et al. |
| 2011/0251009 | A1 | | 10/2011 | Schroth et al. |

FOREIGN PATENT DOCUMENTS

| | | |
|---|---|---|
| DE | 41 02 493 | 7/1992 |
| DE | 4321755 A1 * | 12/1993 ............. F16H 47/08 |
| DE | 101 52 488 | 6/2002 |
| DE | 10 2008 034 607 | 1/2010 |
| EP | 2 101 084 | 5/2011 |
| JP | 52-37666 | 3/1977 |
| JP | 52-501722 | 7/1987 |
| JP | 2007-92982 | 4/2007 |
| WO | 95/01522 | 1/1995 |

OTHER PUBLICATIONS

International Preliminary Report on Patentability dated Jun. 18, 2013 in corresponding International Application No. PCT/EP2012/001669 and English language translation.

Office Action dated Feb. 22, 2016 in corresponding Japanese Application No. 2014-505533.

\* cited by examiner

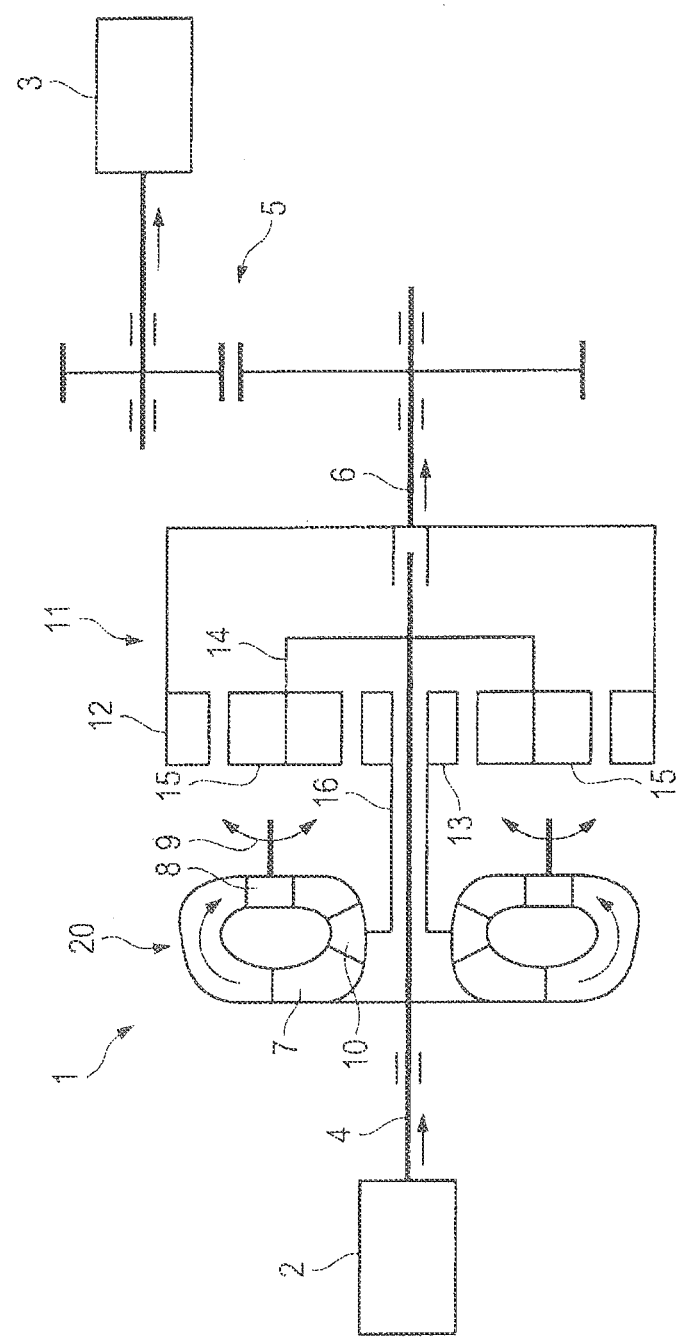

DEVICE FOR TRANSMITTING FORCE

CROSS-REFERENCE TO RELATED APPLICATION

The present application is a National Stage of International Application No. PCT/EP2012/001669, filed Apr. 18, 2012, which claims priority to German Application No. 10 2011 018 236.5, filed Apr. 19, 2011, the entire disclosures of which are hereby expressly incorporated herein by reference.

BACKGROUND/SUMMARY

The invention relates to a device for transmitting force according to the type defined in greater detail in the preamble of claim 1.

A force transmission assembly for driving a variable-speed work machine is known from DE 34 41 877 A1. This force transmission assembly consists of a transmission having planetary gearings, wherein a power branch is divided into a mechanical power branch and a hydrodynamic power branch. The hydrodynamic power branch extends via a hydrodynamic converter and is variable in its speed by the converter. It is unified again with the mechanically transmitted power branch in a planetary gearing and thus drives the work machine at the desired speed, although the drive assembly, which drives the force transmission assembly at the input shaft, runs at constant speed. The structure described in the cited German publication having the concentrically running shafts is to be implemented in a comparatively space-saving manner with respect to structures having shafts which do not run concentrically. However, it requires a coupling sleeve or a hollow shaft and also a stationary transmission for splitting the power branches. This makes the structure comparatively heavy and in particular the use of the coupling sleeve having the comparatively large diameter of the ring gear of the planetary gearing makes the structure relatively costly. In addition, a majority of the force transmission assembly must be installed in the interior of this coupling sleeve, whereby the accessibility is very poor in case of damage, for repair purposes, or the like.

Based on this structure, DE 10 2008 034 607 describes a similar structure, which replaces the hollow shaft with coupling shafts extending in parallel to the central axis of the force transmission assembly. The complex, costly, and very heavy coupling sleeve can thus be omitted. However, the structure is still comparatively large and, due to the external parallel transmission shafts, which must be connected via suitable gearings to the main shaft, comparatively complex and requires manifold individual components. This makes the production and the installation costly and complex.

Furthermore, reference is made to drivetrains in the field of automotive technology. Counterrotating converters in combination with planetary gearings are described here. For example, in DE 41 02 493 A1 or EP 2 101 084 A2. The construction is accordingly complex, since the stated object here is entirely different, namely converting a variable input speed in accordance with the requirements in a suitable gear step/transmission ratio. A variably controlled output speed does not play a role here.

The object of the present invention is therefore to specify a device for transmitting force from a drive assembly running at constant speed to a work machine running at variable speed, which is simple, small, light, and also cost-effective to produce and install.

This object is achieved according to the invention by the features mentioned in the characterizing part of claim 1. Further advantageous embodiments and preferred embodiments are described in the subclaims dependent thereon.

The device according to the invention uses, instead of the heretofore typical hydrodynamic synchronized converter, a hydrodynamic counterrotating converter. It is somewhat worse than a synchronized converter with respect to the efficiency, however, it permits a very simple and compact construction of the device. Since only a specific part of the power is transmitted via the hydrodynamic converter and the larger part of the power is directly mechanically transmitted in any case, no noteworthy restriction results from the efficiency disadvantage of the counterrotating converter with respect to a synchronized converter. The device according to the invention can rather be constructed simply and compactly. The possibility of the compact construction results in particular in the direct attachment of both the turbine wheel and also the pump wheel to corresponding elements of the planetary gearing. A direct attachment as defined in the present invention is to be understood to mean a direct mechanical connection without interposed components such as clutches, transmission elements, or the like.

According to one advantageous embodiment of the device according to the invention, it is provided that the first element is the planet carrier of the planetary gearing, while the second element is the sun wheel of the planetary gearing and the third element is the ring gear of the planetary gearing. This structure, in which the ring gear is connected to the output shaft directly or via a further gearing, preferably a spur gearing, and in which the hydrodynamic power branch is introduced via the sun wheel, has the decisive advantage that the planetary gearing can be embodied very compactly as a result of the favorable speeds.

The device thus offers a very compact structure, which can omit a coupling sleeve. In addition, it can omit an additional stationary transmission in the form of planetary gearings and can thus be embodied as very small and compact having a small number of components and accordingly as simple and cost-effective to produce and install. The structure can, according to an advantageous embodiment, be embodied having precisely one planetary gearing, so that further comparatively complex planetary gearings can be omitted.

According to an advantageous embodiment of the device according to the invention, it is further provided that the turbine of the hydrodynamic counterrotating converter is connected via a hollow shaft to the sun wheel of the planetary gearing and the input shaft extending through the hollow shaft is connected on the side facing away from the hydrodynamic counterrotating converter to the planet carrier. This allows a very compact construction, which may be implemented in a very space-saving manner. The hollow shaft according to this structure is of comparatively small diameter in this case and is by far not as cumbersome and complex as the coupling sleeve in the structure according to the prior art, for example.

In a particularly favorable embodiment thereof, it is provided that the ring gear of the planetary gearing is at least indirectly connected to the output shaft on the side facing away from the hydrodynamic counterrotating converter. The construction may also be implemented very simply and compactly, wherein the mounting of the planetary gearing or one of its elements, respectively, can be implemented such that no or no noteworthy axial forces affect the elements of the planetary gearing. In a corresponding advantageous refinement, it can therefore be provided that the elements of the planetary gearing are embodied as singly helically geared.

Further advantageous embodiments of the device according to the invention additionally result from the remaining dependent subclaims and will be clear on the basis of the exemplary embodiment, which is described in greater detail hereafter with reference to the figures.

BRIEF DESCRIPTION OF THE DRAWING

A schematic illustration of a device according to the invention is shown in the single appended FIGURE.

DETAILED DESCRIPTION OF AN EXEMPLARY EMBODIMENT

In the single appended FIGURE, a device 1 for transmitting force is shown, which connects a drive assembly 2 and a work machine 3 to one another. The drive assembly 2 can be implemented in particular as an engine, particularly preferably as an electric motor. In the structure shown here, this drive assembly typically delivers a constant speed, by which it drives an input shaft 4, which is connected thereto directly or optionally also via a transmission stage (not shown). The work machine 3, which is implemented as a work machine 3 having variable speed, is driven via the device 1. The work machine 3 can be in particular a compressor, a centrifugal pump, or the like. In the exemplary embodiment shown here, it is indirectly connected to an output shaft 6 via a spur gearing 5. A connection via a planetary gearing, bevel gearing, or the like would also be conceivable. The device 1 for transmitting force itself consists of a hydrodynamic counterrotating converter 20, whose pump wheel 7 is directly connected to the input shaft 4. As is typical for a counterrotating converter 20, a flow of the work medium arises from the pump wheel 7 via a stator 8, which is embodied as adjustable, as indicated by the arrow 9, onto a turbine wheel 10. In parallel thereto, the power is directly mechanically transmitted via the input shaft 4. The two power branches are then guided together again by a planetary gearing 11 and jointly reach the region of the output shaft 6.

The planetary gearing 11 is embodied for this purpose as a so-called "D transmission". It has a ring gear 12, a sun wheel 13, and a plurality' of planet gears 15 arranged on a planet carrier 14. In the structure shown here, the turbine wheel 10 of the hydrodynamic counterrotating converter 20 is directly connected via a hollow shaft 16 to the sun wheel 13 of the planetary gearing 11. The input shaft 4 is connected through the hollow shaft 16, on the side of the planetary gearing 11 facing away from the counterrotating converter 20, to the planet carrier 1, 4 and therefore to the individual revolving planet gears 15. The output shaft 6 is in turn connected to the ring gear 12 of the planetary gearing 11.

In accordance with the desired speed of the output shaft 6, by way of a setting of the stator 8 and/or the degree of filling of the hydrodynamic counterrotating converter 20 with working medium, a corresponding power transmission is achieved in the hydrodynamic power branch and therefore from the input shaft 4 to the sun wheel 13. This power transmitted via the hydrodynamic power branch is then added to the main part of the power, which is directly mechanically transmitted, via the planet carrier 14 and reaches the output shaft 6 as joint power via the ring gear 12. In the case shown here, the work machine 3 is then driven via the spur gearing 5 at constant transmission ratio.

Depending on the desired instantaneous speed in the region of the work machine 3, the hydrodynamic counterrotating converter 20 is adjusted accordingly, by adjusting the stator 8 and/or varying the quantity of working medium in the hydrodynamic counterrotating converter 20. Very good variability of the output speed to the desired speed value is thus achieved.

The structure may be implemented in an extraordinarily compact and accordingly light manner, since no stationary transmission is required, no coupling sleeve must be used, and since because of the very favorable speeds, a comparatively small planetary gearing 11 can be used. Because of the possibilities for mounting in particular the input shaft 4 on the output shaft 6, a structure results which does not cause any or any noticeable forces in the axial direction on the individual elements 12, 13, 15 of the planetary gearing 11. It is therefore possible to embody the individual elements 12, 13, 15 of the planetary gearing 11 in single helical gearing, so that they can be implemented comparatively simply and cost-effectively not only because of their structural size, but rather also because of their construction.

The structure is overall very compact, light, and, because of the comparatively small number of individual elements, can be produced and installed simply and cost-effectively.

The invention claimed is:

1. A device for transmitting force from an input shaft to an output shaft comprising a counterrotating hydrodynamic converter and a transmission comprising a planetary gearing, comprising a ring gear, a sun wheel, and a planet carrier and a plurality of planet gears, the input shaft is directly connected to a pump wheel of the counterrotating hydrodynamic converter and a first element of the planetary gearing, a turbine wheel of the counterrotating hydrodynamic converter is directly connected to a second element of the planetary gearing, and the output shaft is connected to a third element of the planetary gearing; wherein the first element is the planet carrier of the planetary gearing, the second element is the sun wheel of the planetary gearing, and the third element is the ring gear of the planetary gearing.

2. The device according to claim 1, wherein precisely one planetary gearing is provided.

3. The device according to claim 1, further comprising a work machine and a gearing between the planetary gearing and the work machine.

4. The device according to claim 1, wherein the turbine wheel is connected via a hollow shaft to the sun wheel, and the input shaft, extending through the hollow shaft, is connected, on a side of the planetary gearing facing away from the counterrotating hydrodynamic converter, to the planet carrier.

5. The device according to claim 1, wherein the ring gear is directly connected, on a side of the planetary gearing facing away from the counterrotating hydrodynamic converter, to the output shaft.

6. The device according to claim 1, wherein the ring gear, the planet gears and the sun wheel are embodied as singly helically geared.

7. The device according to claim 1, further comprising a drive assembly having a constant speed, the input shaft connected at least indirectly to the drive assembly, the drive assembly comprising an electric motor.

8. The device according to claim 1, further comprising a work machine having a variable speed, the output shaft connected at least indirectly to the work machine, the work machine comprising a conveyor apparatus for a fluid comprising one of a compressor, a pump, and a centrifugal pump.

9. The device according to claim 2, further comprising a work machine and a gearing between the planetary gearing and the work machine.

10. The device according to claim 2, wherein the turbine wheel is connected via a hollow shaft to the sun wheel, and the input shaft, extending through the hollow shaft, is connected, on a side of the planetary gearing facing away from the counterrotating hydrodynamic converter, to the planet carrier.

11. The device according to claim 3, wherein the turbine wheel is connected via a hollow shaft to the sun wheel, and the input shaft, extending through the hollow shaft is connected, on a side of the planetary gearing facing away from the counterrotating hydrodynamic converter, to the planet carrier.

12. The device according to claim 2, wherein the ring gear is at least indirectly connected, on a side of the planetary gearing facing away from the counterrotating hydrodynamic converter, to the output shaft.

13. The device according to claim 3, wherein the ring gear is at least indirectly connected, on a side of the planetary gearing facing away from the counterrotating hydrodynamic converter, to the output shaft.

14. The device according to claim 4, wherein the ring gear is at least indirectly connected, on a side of the planetary gearing facing away from the counterrotating hydrodynamic converter, to the output shaft.

15. The device according to claim 2, wherein the ring gear, the planet gears, and the sun wheel are embodied as singly helically geared.

16. The device according to claim 3, wherein the ring gear, the planet gears, and the sun wheel are embodied as singly helically geared.

17. The device according to claim 4, wherein the ring gear, the planet gears, and the sun wheel are embodied as singly helically geared.

18. The device according to claim 5, wherein the ring gear, the planet gears, and the sun wheel are embodied as singly helically geared.

19. The device according to claim 2, further comprising a drive assembly having a constant speed, the input shaft connected at least indirectly to the drive assembly, the drive assembly comprising an electric motor.

20. The device according to claim 3, further comprising a drive assembly having a constant speed, the input shaft connected at least indirectly to the drive assembly, the drive assembly comprising an electric motor.

* * * * *